J. L. WAYNE, 3D.
LUBRICATOR.
APPLICATION FILED APR. 27, 1914.
1,166,643.
Patented Jan. 4, 1916.
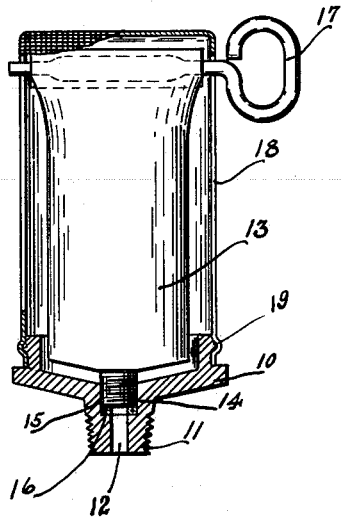
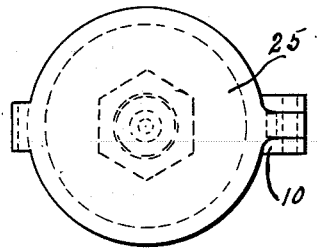
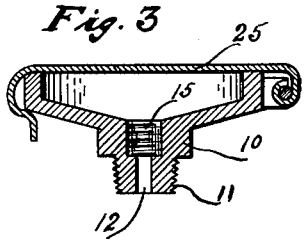
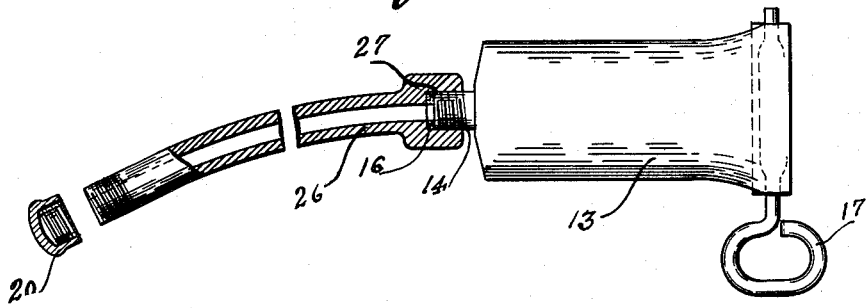
WITNESSES:
Josephine Gasper
INVENTOR
Jacob Lloyd Wayne 3rd
BY
Arthur M. Hood
ATTORNEY

UNITED STATES PATENT OFFICE.

JACOB LLOYD WAYNE, 3D, OF INDIANAPOLIS, INDIANA.

LUBRICATOR.

1,166,643.　　　　Specification of Letters Patent.　　Patented Jan. 4, 1916.

Application filed April 27, 1914. Serial No. 834,583. REISSUED

*To all whom it may concern:*

Be it known that I, JACOB LLOYD WAYNE, 3d, a citizen of the United States, residing at Indianapolis, in the county of Marion and State of Indiana, have invented new and useful Lubricators, of which the following is a specification.

In the operation of all kinds of machinery, it is essential that the bearing surfaces be kept well lubricated. Yet the ordinary lubricators are frequently located, by necessity, at places where dirt and grease accumulate on them, so that their operation is frequently very distasteful as well as difficult and there is a tendency on the part of the operator to neglect them. This is especially true in motor cars and other power driven vehicles.

It is the object of my present invention to make the operating of a lubricator easier and less distasteful, to avoid any exposed grease which invites dirt to accumulate, and to make the handling of the supply of lubricant easy and not unpleasant.

In accomplishing this object I put up the lubricant in collapsible tubes, preferably provided with screw threaded discharge nozzles; and connecting these collapsible tubes to the apertures of the lubricator cups by such nozzles. Then by compressing the tube the lubricant may be fed to the surface to be lubricated, as required. This compression may be obtained in any desired manner, but most conveniently by a suitable key. When the tube is emptied a full tube may be easily substituted for it.

The accompanying drawings illustrate my invention.

Figure 1 is a sectional view of one form of the lubricator with a collapsible tube of lubricant associated with it; Fig. 2 is a view showing a collapsible tube of lubricant with an extended nozzle; and Figs. 3 and 4 are sectional and plan views respectively of a grease cup with which the device shown in Fig. 2 may be removably associated.

In the arrangement shown in Fig. 1, there is a grease cup 10, which is shown as having an externally screw-threaded projection 11 by which it may be associated with the device to be lubricated, there being a duct 12 which extends through such projection 11 to conduct the lubricant to the surfaces to be lubricated. A collapsible tube 13 for the lubricant is removably associated in any desired grease-tight manner with the grease cup 10, so that when compressed it will discharge lubricant into and through the aperture 12 to the surfaces to be lubricated. This tube forms a lubricant container which is hermetically sealed save at the discharge opening. In the arrangement shown the collapsible tube 13 is provided with a nozzle 14 which fits into an opening 15 at the inlet end of the duct 12, the nozzle 14 and opening 15 conveniently being screw-threaded to provide a convenient means of attachment. If desired, a washer 16 may be placed between the collapsible tube and the grease cup to seal the joint more effectively. By now compressing the tube 13 in any suitable manner, the lubricant contained therein is forced through the duct 12 to the surfaces to be lubricated. A convenient way of compressing the tube is by a key 17, which fits over the permanently closed end of the tube in a well-known manner and when turned flattens the tube and winds it up on itself, thereby forcing out the contents of the tube.

The grease cup may have associated therewith a removable cap 18 for inclosing the collapsible tube, this cap being fastened to the grease cup in any suitable manner, as by having a spring fit over a flange 19 of the grease cup. If desired, the cap 18 may be longitudinally slotted to receive the key 17, the slots serving as guides for the key. With this arrangement no lubricant can escape from the tube to exposed parts, so that comparative cleanliness is maintained, and the operation of the lubricator is rendered less distasteful. When a tube is emptied, the cap 18 may be removed, the empty tube detached, and a full tube attached in its place, and the cap 18 replaced. In case lubricant of different consistencies is used, as in hot and cold weather, the tubes may be changed without waste and with ease as desired. Practically all contact with dirt and grease is avoided both in connection with the grease cup and in dealing with the tubes. When a tube is not in use its outlet may be suitably covered, as by an internally screw-threaded cap 20 fitting the nozzle 14.

In the arrangement just described the collapsible tube is ordinarily left in place until empty, unless it is desired to remove it sooner as for changing the tubes. Where it is not desirable to leave the collapsible tube in place the arrangement shown in Figs. 2, 3, and 4 may be used. Here instead of the slotted cap 18 of Fig. 1, a flat cap 25 is provided for the grease cup 10, for closing the latter, and the collapsible tube 13 is put in place only when the cap 25 is moved to expose the inlet end of the aperture of the grease cup, and is removed when the desired amount of lubricant has been forced, as by the key 17, to the surface to be lubricated. If desired, a nozzle extension 26 may be provided for the collapsible tube, such nozzle extension conveniently having one end in the form of a socket 27 adapted to receive the discharge end of the tube and the other end adapted to be associated with the inlet end of the aperture through the grease cup and also to receive the cap 20. The nozzle extension may be of any suitable shape, and either stiff or flexible. This nozzle extension greatly facilitates the reaching of the more inaccessible grease cups.

It is not necessary that the part which I have called the grease cup be non-integral with the associated part of the machine having the surface to be lubricated, for by the term "grease cup" I mean merely a device having a duct for leading to a surface to be lubricated.

I claim as my invention:

1. The combination of a grease cup and a collapsible tube containing lubricant, said cup and tube having interfitting parts whereby the tube may be removably attached to the cup, a slotted cap for said grease cup, and a key for compressing said tube, said key being guided by the slots in the cap and projecting through one of such slots for external manipulation.

2. The combination of a grease cup and a collapsible tube containing lubricant, said cup and tube having interfitting parts together providing a grease-tight joint whereby the tube may be removably attached to the cup, and a removable cap for said grease cup, said cap when removed exposing the tube for manual grasping.

3. The combination of a grease cup and a collapsible tube containing lubricant, said cup and tube having interfitting parts together providing a grease-tight joint with the tube exposable for manual grasping, whereby the tube may be removably attached to and detached from the cup.

4. In combination, a grease cup and a lubricant container having interfitting parts together forming a grease-tight joint with the lubricant container exposable for manual grasping, whereby the lubricant container may be removably attached to the grease cup, said lubricant container being tightly sealed save at the discharge opening, and means for forcing the grease out of said grease container.

5. In combination, a grease cup and a lubricant container having interfitting parts together forming a grease-tight joint with the lubricant container exposable for manual grasping, whereby the lubricant container may be removably attached to the grease cup, said lubricant container being tightly sealed save at the discharge opening.

6. In combination, a grease cup having a screw-threaded socket, a collapsible lubricant tube having a screw-threaded nozzle fitting such socket, a cap associated with said grease cup and covering the collapsible tube when the latter is attached to the cup, said cap being provided with guide slots, and a key for collapsing such tube, said key fitting in and being guided by said slots and projecting through one of such slots for external manipulation.

7. In combination, a grease cup having a screw-threaded socket, and a collapsible lubricant tube having a screw-threaded nozzle fitting such socket, said tube being exposable for manual grasping when its nozzle is mounted in such socket.

8. In combination, a grease cup having a screw-threaded socket, a collapsible lubricant tube having a screw-threaded nozzle fitting such socket, and a removable cap associated with said grease cup and covering the collapsible tube when the latter is attached to the cup, said cap when removed exposing the tube for manual grasping.

9. In combination, a duct for leading to a surface to be lubricated, and a collapsible tube containing lubricant, said duct and tube being provided with means whereby they can be removably associated, and said tube being exposable for manual grasping when associated with the duct.

In witness whereof I have hereunto set my hand at Indianapolis, Indiana, this twenty-fourth day of April, A. D. one thousand nine hundred and fourteen.

JACOB LLOYD WAYNE, 3D.

Witnesses:
VIVIAN LOUISE BENNETT.
G. B. SCHLEY.